United States Patent
Niemöller

(10) Patent No.: US 12,517,045 B2
(45) Date of Patent: Jan. 6, 2026

(54) SYSTEMS AND METHODS FOR PREDICTING SAMPLE PROPERTIES BASED ON SPECTRAL MEASUREMENTS

(71) Applicant: Bruker Optics GmbH & Co. KG, Ettliingen (DE)

(72) Inventor: Andreas Niemöller, Ettllingen (DE)

(73) Assignee: Bruker Optics GmbH & Co. KG, Ettlingen (DE)

( * ) Notice: Subject to any disclaimer, the term of this patent is extended or adjusted under 35 U.S.C. 154(b) by 489 days.

(21) Appl. No.: 18/067,548

(22) Filed: Dec. 16, 2022

(65) Prior Publication Data
US 2023/0194424 A1    Jun. 22, 2023

(30) Foreign Application Priority Data

Dec. 21, 2021   (EP) .................................... 21216344

(51) Int. Cl.
  *G01N 21/27*   (2006.01)
  *G01J 3/28*    (2006.01)
  *G01N 21/359*  (2014.01)

(52) U.S. Cl.
  CPC .............. *G01N 21/359* (2013.01); *G01J 3/28* (2013.01); *G01N 21/274* (2013.01)

(58) Field of Classification Search
  CPC .... G01N 21/359; G01N 21/35; G01N 21/274; G01N 21/3577; G01N 21/65;
  (Continued)

(56) References Cited

U.S. PATENT DOCUMENTS

2004/0167724 A1 * 8/2004 Federer .................. G01N 21/65
                                                     702/32
2018/0168490 A1 * 6/2018 Jones ................... A61B 5/7282

FOREIGN PATENT DOCUMENTS

AU    2010364670 A1 *  6/2013   ............. G01N 21/00
AU    2012240669 A1 * 11/2013   ................ G01J 3/10
(Continued)

OTHER PUBLICATIONS

D. L. Donoho et al.: "Ideal spatial adaptation by wavelet shrinkage," Biometrika, vol. 81, Issue 3, Sep. 1994, pp. 425-455.
European Search Report for Application No. 21216344.8, mailed on Jun. 14, 2022, 8 pages.
(Continued)

*Primary Examiner* — Jeffrey P Aiello
(74) *Attorney, Agent, or Firm* — Brake Hughes Bellermann LLP

(57) ABSTRACT

Techniques are disclosed for predicting a property value of a sample of a particular sample type. A wavelet transformation is applied to the obtained spectrum to compute a sample set of wavelet coefficients in a plurality of wavelet bands. Calibration sets of wavelet coefficients are computed by wavelet transformations of respective NIR/MIR spectra obtained from calibration samples of at least the particular sample type. Each calibration set is associated with one or more reference property values of the respective calibration sample. The system creates a local PLS model of the to-be-determined property value of said sample by selecting a predefined number k of nearest neighbors of the sample set, and computes the local PLS model based on the selected k nearest neighbors and their associated reference property values. The property value of said sample is predicted by applying the local PLS model to the sample set.

20 Claims, 13 Drawing Sheets

(58) Field of Classification Search
CPC ............... G01N 21/33; G01N 21/3581; G01N 21/3504; G01N 21/3563; G01N 2201/129; G01N 2021/8416; G01N 24/085; G01N 29/46; G01J 3/0264; G01J 3/28; G01J 3/02; G01J 3/2823; G01J 3/42; G01J 3/462; G01J 2003/2866
USPC ......... 250/339.12, 341.8; 356/300, 319, 326, 356/301, 51; 700/28, 48, 104; 702/30, 702/183, 22, 25, 189, 179, 181, 182, 23, 702/1, 85, 104, 188, 77, 40; 703/2; 706/1, 12

See application file for complete search history.

(56) References Cited

FOREIGN PATENT DOCUMENTS

| | | | | |
|---|---|---|---|---|
| AU | 2013284368 A1 | * | 1/2015 | ............ A61B 5/0075 |
| CA | 2787864 A1 | * | 7/2011 | ............ A01K 45/007 |
| CA | 2874077 A1 | * | 11/2013 | ......... G01N 21/3577 |
| CA | 3065979 A1 | * | 6/2021 | ....... G01N 33/57419 |
| WO | WO-03031954 A1 | * | 4/2003 | ............ A61B 5/0059 |

OTHER PUBLICATIONS

H. Lohninger: "Fundamentals of Statistics—Distance and Similarity Measures," available online at <http://www.statistics4u.com/fundstat_eng/cc_distance_meas.html>, 2010, 2 pages.

J. S. Shenk et al.: "Investigation of a LOCAL calibration procedure for Near instruments" Journal of Near Infrared Spectroscopy, vol. 5, Issue 4, 1997, pp. 223-232.

P. Berzaghi et al.: "LOCAL Prediction with near Infrared Multi-Product Databases" Journal of Near Infrared Spectroscopy, vol. 8, Issue 1, 2000, pp. 1-9.

J. Depczynski et al.: "Quantitative analysis of near infrared spectra by wavelet coefficient regression using a genetic algorithm," Chemometrics and Intelligent Laboratory Systems, vol. 47, Issue 2, May 1999, pp. 179-187.

C. Cai et al.: "Treating NIR Data With Orthogonal Discrete Wavelet Transform: Predicting Concentrations of a Multi-Component System Through a Small-Scale Calibration Set", Elsevier; Talanta 77, No. 2, Dec. 15, 2008, pp. 822-826.

Y. Liu et al.: "Wavelet Analysis Techniques Applied to Removing Varing Spectroscopic Background in Calibration Model for Pear Sugar Content", Proc. of SPIE, vol. 5996; 2005, 12 pages.

Mandal et al., "Erstellung Und Validierung Einer Kombinierten NIR/Raman-Bibliothek Zur Identitatskontrolle Organischer Und Anorganischer Substanzen", Internet Citation; http://www.ub.uni-duisburg.de/diss/diss9928/inhalt.htm, Dec. 21, 1999, 104 pages.

* cited by examiner

SYSTEMS AND METHODS FOR PREDICTING SAMPLE PROPERTIES BASED ON SPECTRAL MEASUREMENTS

CROSS-REFERENCE TO RELATED APPLICATIONS

This application claims priority to EP Patent Application No. 21216344.8, filed on Dec. 21, 2021 and entitled "Systems and methods for predicting sample properties based on spectral measurements," the disclosure of which is hereby incorporated by reference in its entirety.

TECHNICAL FIELD

The present description generally relates to spectroscopic measurements of samples, and more particularly relates to predicting a sample property using measured spectra obtained by near-infrared (NIR) or mid-infrared (MIR) spectroscopic measurements.

BACKGROUND

A problem in spectroscopy is the multivariate calibration creation and evaluation of near-infrared (NIR) or mid-infrared (MIR) spectra or other spectral measurement data obtained from samples. Examples of common NIR applications are in the field of chemical analysis and address the quantitative analyses of chemical or physical properties of samples, i.e., fat, protein and water content in milk powder or animal feed, benzene content in petrol, etc. For spectroscopic methods, such as NIR, MIR, XRF, etc., secondary analytical methods require calibration in order to establish a relationship between the measured value or values (spectrum) and a sample property (concentration, density, viscosity, etc.). There are uni- or multivariate calibration procedures for this purpose, which are mostly based on correlation and regression.

Prior art approaches for addressing multivariate calibration are typically based on any of the following algorithms:
- PLS (Partial Least Squares or Projection to Latent Structures): often used for NIR spectrometry. PLS models always work linearly, i.e., the relationship between the property to be calibrated and the latent variables (PLS scores) is established linearly via a regression calculation. Typically, a component of the sample is also a property of said sample.
- SVR (Support Vector Regression): based on kernel-based SVM (Support Vector Machines) algorithms. Depending on the kernel, models can be created linearly or non-linearly. SVR allows in many cases the creation of more accurate models compared to PLS in the case of larger and more heterogenous data sets.
- Local regression, LOCAL and LWR (Local Weighted Regression): ultimately based on PLS, but using a spectrum library (spectral data) to first find spectra matching the spectrum to be analyzed. With these, a local model is calculated and the spectrum is evaluated. PLS works linear, but by the local selection of the calibration spectra matching the analysis spectrum, non-linear effects are avoided. Another approach using local regression is based on latent variables (scores) derived by principal component analysis or PLS.
- ANN (Artificial Neural Networks): based on possibly several layers of internal neurons (imitating the function of the human brain). Such models can be trained for the evaluation of spectra. This also enables non-linear modelling, i.e., the models are never strictly linear. ANNs are trained with random inner starting values and are therefore not deterministic, like PLS or local regression, which can be a disadvantage.

All of the prior approaches directly use spectra to create calibrations, which is standard with PLS with reasonable computation times. With SVR, local regression and ANN, the calculation times become significantly longer than with PLS. Depending on the setup, the increase in computation times may be by a multiple or even by an order of magnitude. Further, the spectra must also be pre-processed. That is, a spectral range selection must be made and in any case a data pre-processing (derivation, normalization) is required.

In the case of local regression implementations (e.g., LOCAL), the model must contain all the original spectra, which results in very large files that have to be distributed in networks of NIR instruments in a lengthy process.

The effort required to build up a library including a sample database by measuring NIR or MIR spectra and storing such spectra together with the respective sample properties determined by primary analysis methods is very high. To prevent unauthorized access to the library, strong data protection mechanisms are required which slow down the implementation of any new evaluations (e.g., analysis or prediction of a new measured sample).

SUMMARY

There is therefore a need to provide system and method that overcome the above-described drawbacks of the prior art Multivariate Calibration approaches for Spectroscopic Measurement Data to be used for determining sample properties from NIR/MIR spectra obtained from such samples. The herein disclosed approach suggests multivariate calibration and evaluation of wavelet-transformed NIR spectra and potentially other spectral measurement data, rather than using the obtained spectra directly (as in the prior art). That is, not the spectra but rather the wavelet-transformed spectra are evaluated, which has advantages such as enabling various filter and signal selection procedures that are not possible with the prior art approaches. In particular in embodiments using filter functions for filtering out certain wavelet bands and/or wavelet coefficients with less valuable information with regard to the original signal (spectrum), it may be advantageous that it is not possible to derive the original calibration spectra from the wavelet transformed calibration sets stored in a respective library. That is, such embodiments prevent unauthorized access to the original spectra without a need for further data protection mechanisms.

In one embodiment, a computer-implemented method is provided for predicting (estimating) a property value of a sample of a particular sample type. The prediction is based on a NIR/MIR spectrum obtained from the sample. Sample properties which can be analyzed with NIR/MIR spectroscopy include but are not limited to a concentration (in said sample) of: a particular compound in the measured sample, the iodine number, the pH value, the content of water, protein, fat, fiber, ash, fatty acids, and free fatty acids; or another property (measurable by NIR/MIR spectroscopy) not related to a concentration comprising: density, viscosity, octane and cetane number. The method may be performed by a computer system which implements functional modules to perform the functions described in the following.

The method starts with applying a wavelet transformation to the obtained spectrum. For example, the wavelet transformation may be a discrete wavelet transformation (DWT), but other wavelet transformation types (e.g., continuous or multiscale wavelet transform (CWT), wavelet package transformation) may be used as well. As a result, a sample set of wavelet coefficients in a plurality of wavelet bands is computed. In general, a wavelet transformation allows to analyze a signal on contained frequencies but, in contrast to a Fourier Transformation, it is known where the frequency is located in the signal. The wavelet itself has a compact support, meaning that it is not periodic. A wavelet transformation of a spectrum results in a lowpass representation band and the so-called detailed bands. The wavelets coefficients of the lowpass representation band (j=0) are the so-called approximation or scaling coefficients. The approximation, or scaling, coefficients are the lowpass representation of the signal. Such approximation coefficients are not providing valuable information for the later modeling and prediction steps and are not used any further for the herein described approach. The valuable information about details of the signal is found in the wavelet coefficients in the detailed bands starting with the band j=1. In the following description, the band j=1 is always referred to as the lowest band.

There are several families with many possible wavelet types and shapes. For example, for the wavelet transformation, the Haar-Wavelet as the simplest one and the common other Daubechies types can be used to decompose a spectrum and to use the coefficients directly, as well as any other wavelet type including more complex ones. However, in the context of the herein disclosed approach the wavelet type is not too relevant but still may have influence on results and complexity of the described process. The wavelet transformation is fast and works with each individual spectrum alone. That is, any spectrum can be transformed individually into a corresponding wavelet-transformed spectrum to be used in a library, and can further be used in the subsequent prediction step of a new sample spectrum. In other words, a library does not depend on the data set as it is the case for classic PLS or other multivariate methods depending on factor analysis (variance analysis), such as for example PCA (Principal Component Analysis), where changes in a library by adding or removing samples requires a complete recalculation of the library (e.g., a recalculation of the scores and loadings). That is, in the wavelet space each calibration set can be added to the library or deleted from the library without affecting the other calibration sets of the library. For the wavelet transformation a pre-processing of the spectra is not required at all which simplifies the calibration and optimization process.

Then, the system accesses a library with a plurality of calibration sets of wavelet coefficients defining a calibration coefficient space. The library can be an integral part of the system or it may be provided by a remote storage with an appropriate access interface. The calibration sets are computed by wavelet transformations of respective NIR/MIR spectra obtained from calibration samples for using Wavelet Local Regression (WLR). Besides calibration sets for calibration samples of the same sample type as said sample, the library may also include calibration sets for other sample types. Each calibration set is associated with one or more reference property values of the respective calibration sample. A reference property value is a value which was measured (or analyzed) by using a reference method (primary analysis method). Each calibration set represents a point in the multi-dimensional wavelet coefficient space with the coefficients of a particular calibration set representing the coordinates of this point in the multi-dimensional wavelet coefficient space. Of course, also the sample set represents a point in this multi-dimensional space. For application areas like feed and feed ingredients, grain and other agricultural or food products as well as soil, thousands of spectra are available and many materials and finished product recipes need to be considered. The herein disclosed approach allows to cover many sample types within one library and avoids the creation of a large number of individual PLS models as proposed in the above prior art approaches.

The construction of a WLR library does not require any kind of modeling or other chemometric step. The spectra obtained from the calibration samples may be interpolated and then transformed into the calibration sets using the wavelet transformation. The calibration sets of the library should cover the same spectral range or the same spectral ranges. The library covers the entire spectral range of the measured spectrum but a larger sub-range or multiple sub-ranges may be sufficient as input. A typical spectral range for a measured NIR spectrum is from 10000 cm-1 to 4000 cm-1, and a typical spectral range for a measured MIR spectrum is from 4000 cm-1 to 400 cm-1. The spectra may be interpolated in order to achieve a number of 2n data points, which may be advantageous for the wavelet transformation, but not mandatory. This allows to also use spectra with slightly different resolutions for the library, if the spectral differences are not too large due to unequal resolution. Each calibration set (wavelet-transformed calibration spectrum) is represented in the library by a vector of wavelet coefficients which is sorted in wavelet bands. These wavelet coefficients span said multi-dimensional wavelet coefficient space in which new spectra (obtained from said sample) can localized which allows to create a local PLS model from the nearest neighbors as described in the following.

Based on the calibration sets of the library, the system now creates a local PLS model of the to-be-determined property of said sample. Local regression methods, such as LWR (Local Weighted Regression) or the LOCAL approach by Shenk and Westerhaus are known. The herein disclosed approach is based on PLS but uses the library to first identify suitable calibrations sets (k Nearest Neighbors (kNN) of the sample set) in the multi-dimensional wavelet space for the obtained spectrum to be analyzed. With such identified spectra a local PLS model is calculated, and the (obtained) spectrum to be analyzed is evaluated.

In more detail, for creating the local PLS model, the system firstly identifies a predefined number of nearest neighbors of the sample set in the calibration coefficient space. For example, the nearest neighbors may be identified based on the mathematical distance between their calibration sets and the sample set. Such mathematical distance is a measure for the distances between objects in multidimensional space forming the basis for many multivariate methods of data analysis. In general, the distance between any two points in n-dimensional space may be calculated by the Minkowski equation. There are three special cases of the Minkowski distance: city block (Manhattan) distance, the Hamming distance, and the Euclidean distance.

In practical experiments, the predefined number k of nearest neighbors was selected from a range of 25 to 1000. Advantageously, the predefined number k is selected from the range of 100 to 300. Very good results are achieved when using 200 nearest neighbors for the model creation. The local PLS model is then computed based on the selected k nearest neighbors (kNN) and their associated reference property values.

The local selection of k nearest neighbor calibration sets allows to minimize or even avoid non-linear effects in advance because, with the assumption that k nearest neighbors are similar to the sample, the created local PLS model needs to cover a lower spectral variance with regard to the spectral variance of the selected kNNs. This approach may be advantageous with regard to the following aspects:

- A combination of many spectra of different products (samples) and sample types is easily possible if the library includes a sufficient amount of calibration samples (wavelet transformed) for each sample type.
- The local PLS model approach in average shows lower method errors (for example, RMSEP) and is therefore more precise (accurate) than approaches using global PLS models based on the same global data set (of the calibration samples).
- Updating the library with further calibration sets can easily be done by users of the herein disclosed system and does not require any central library provider activities like a recalculation of the library.

Finally, the system predicts the to-be-determined property value of said sample by applying the local PLS model to the sample set. In general, a local PLS model includes weighting coefficients or regression coefficients. These coefficients form the so-called b-vector, representing the PLS model as result of the PLS modelling, which, in the case of using the wavelet coefficient space, has a size that corresponds to the number of underlying wavelet coefficients (e.g., 60 wavelet coefficients). It is to be noted that in prior art methods working in the spectral dimension, the b-vector easily amounts to a size 500 or more (corresponding to the underlying datapoints of the respective spectra). Through the multivariate local PLS model, each data point (i.e., each wavelet coefficient) receives a weighting. This weighting is then applied to the wavelet transform of the obtained sample spectrum. That is, the b-vector is multiplied with the wavelet transform of the obtained sample spectrum. The prediction result is obtained by adding the now weighted coefficients and adding the so-called b0-coefficient.

No spectral range selection or data pre-processing is required, but possible. Since PLS works adaptively via the weighting of the individual coefficients, no coefficients must be selected in the selected bands, however, filtering or thresholding can be used. A normalization of the wavelet coefficients can also be helpful both for building the library and for analysis of the obtained sample spectrum. Some optional embodiments implement such additional filter functions which allow filtering of wavelet coefficients for various purposes as described below.

In one embodiment, the wavelet coefficients of the sample set may be normalized by using vector normalization.

In one embodiment, for each wavelet coefficient of a calibration set the respective variance for the selected k nearest neighbors can be determined. The wavelet coefficients with a variance below 5% of the largest variance amongst the wavelet coefficients are then not used when creating the local PLS model for making the property value prediction. This function allows to filter out wavelet coefficients which show no variance over the whole data set, e.g., representing a baseline or total absorbance region in the calibration sets. As this filter criterion is independent of the sample property it can be generally used to reduce the number of wavelet coefficients used for the local PLS model.

In one embodiment, the correlation with the actual property of interest of the respective calibration sample for the selected k nearest neighbors is determined. When creating the local PLS model, the wavelet coefficients with a correlation below a predefined correlation threshold value are not used. A suitable correlation threshold value is in the order of 85%. In other words, using selection by correlation r2 allows to only consider coefficients with a correlation higher than the correlation threshold. Filtering out wavelet coefficients with a too low correlation improves the prediction accuracy of the local PLS model as wavelet coefficients that are not relevant and affected by noise are not used. As this filter criterion is dependent on the sample property it can be used to reduce the number of wavelet coefficients used for the dedicated local PLS model for a particular property.

In one embodiment, applying a wavelet transformation comprises computing a universal threshold value of the wavelet coefficients of the highest wavelet band of the sample set for the selected k nearest neighbors. The universal threshold as thresholding parameter has been proposed by Donoho and Johnstone. The universal threshold acts as a filter function which allows to ignore all wavelet coefficients with a value below said computed universal threshold value when creating the local PLS model. This thresholding filter function allows truncating of wavelet coefficients with too small values which are comparable with noise. Again, this filter criterion is independent of the sample property and can also be used to reduce the number of wavelet coefficients used for the local PLS models.

In one embodiment, a rank for a local PLS model for a corresponding property may be set. One option is to set a rank manually for a property and the whole library as a global rank. However, this option is based on trial and error and is time consuming. A more advantageous option is an automated and new approach where each calibration set in the library has a rank that was determined by a cross-validation of the whole library for all respective calibration sets with regard to a corresponding property. The rank of the created local PLS model used for determining said property value of said sample can then be computed based on the ranks of the identified nearest neighbors. In one implementation, the rank of the created local PLS model may be computed as the rank which is associated with the majority of the nearest neighbors. In an alternative implementation, the system may compute the rank as the rounded average of the ranks of the sample set's nearest neighbors in the multi-dimensional wavelet coefficient space. The rank of the computed local PLS model is typically in the range from 1 to 35, advantageously the rank is in the range from 2 to 15. When the library is created, a so-called cross validation is carried out. That is, each calibration set itself is analyzed with WLR and the appropriate rank is determined by comparing the rank-dependent results with the known reference value of the calibration set and finding the lowest absolute difference. This optimal rank is saved in the library for each calibration set. When creating a new local PLS model for analyzing a new spectrum (of said sample), either the rank determined via the majority principle or the rounded average rank of the local PLS model may be used for the spectrum analysis. When expanding the library, a new cross-validation is only necessary for a new calibration set, or for a new property reference value.

In one embodiment, at least the lowest wavelet band and the highest wavelet band of the computed sample set are ignored when creating the local PLS model and predicting the sample property value. This selection of wavelet bands typically ignores at least the lowest and the highest band as they do not contain relevant information because NIR/MIR signals are almost always reflected in the wavelet bands between such extreme bands. From a user input, the system may receive one or more additional higher bands to be ignored. By the selection of the wavelet bands used for property value prediction analysis (a parameter for WLR), the coefficients are selected band by band and then used. For example, the system may only use the coefficients of one wavelet band for the nearest neighbor search in the library to keep computation time low. The nearest neighbor search over the kNN slows down exponentially with an increasing number of dimensions. A medium wavelet band can already represent the most important spectral information (with sufficient variance) to identify the appropriate region in the library with the appropriate kNNs. However, a plurality of wavelet bands may be used for local PLS modeling, since this provides more information and the larger number of variables does not burden the PLS calculation for the local modelling.

The wavelet transformation of the spectra and truncating complete wavelet bands, as well as optional initial filtering, result in a data compression when storing the library without loss of important NIR/MIR related information. This is advantageous when supplying such libraries in networks of instruments where file sizes are still a topic for territories with poor internet connectivity.

In general, a wavelet transformation into any wavelet type can be used. This includes but is not limited to the following wavelet types: Haar wavelet; Daubechies wavelets db2, db4, db6, and db8; Morlets; Symlets; Coiflets; and Biorthogonal wavelets. Other wavelet types may be used, too.

In one embodiment, a computer program product is provided for predicting a property value of a sample of a particular sample type, based on a NIR/MIR spectrum obtained from the sample. The computer program product has computer-readable instructions that, when loaded into the memory of a computing device and processed by one or more processors of the computing device, cause the computing device to execute the method steps of the computer-implemented method disclosed herein.

In one embodiment, a computer system is provided for predicting a property value of a sample of a particular sample type, based on a NIR/MIR spectrum obtained from the sample. The system has functional modules adapted to execute the method steps the computer-implemented method disclosed herein. For example, the computer system has a memory to load said computer program product and one or more processors to run said program for implementing said functional modules.

Further aspects of the description will be realized and attained by means of the elements and combinations particularly depicted in the appended claims. It is to be understood that both, the foregoing general description and the following detailed description are exemplary and explanatory only and are not restrictive.

DETAILED DESCRIPTION

Figure 1:
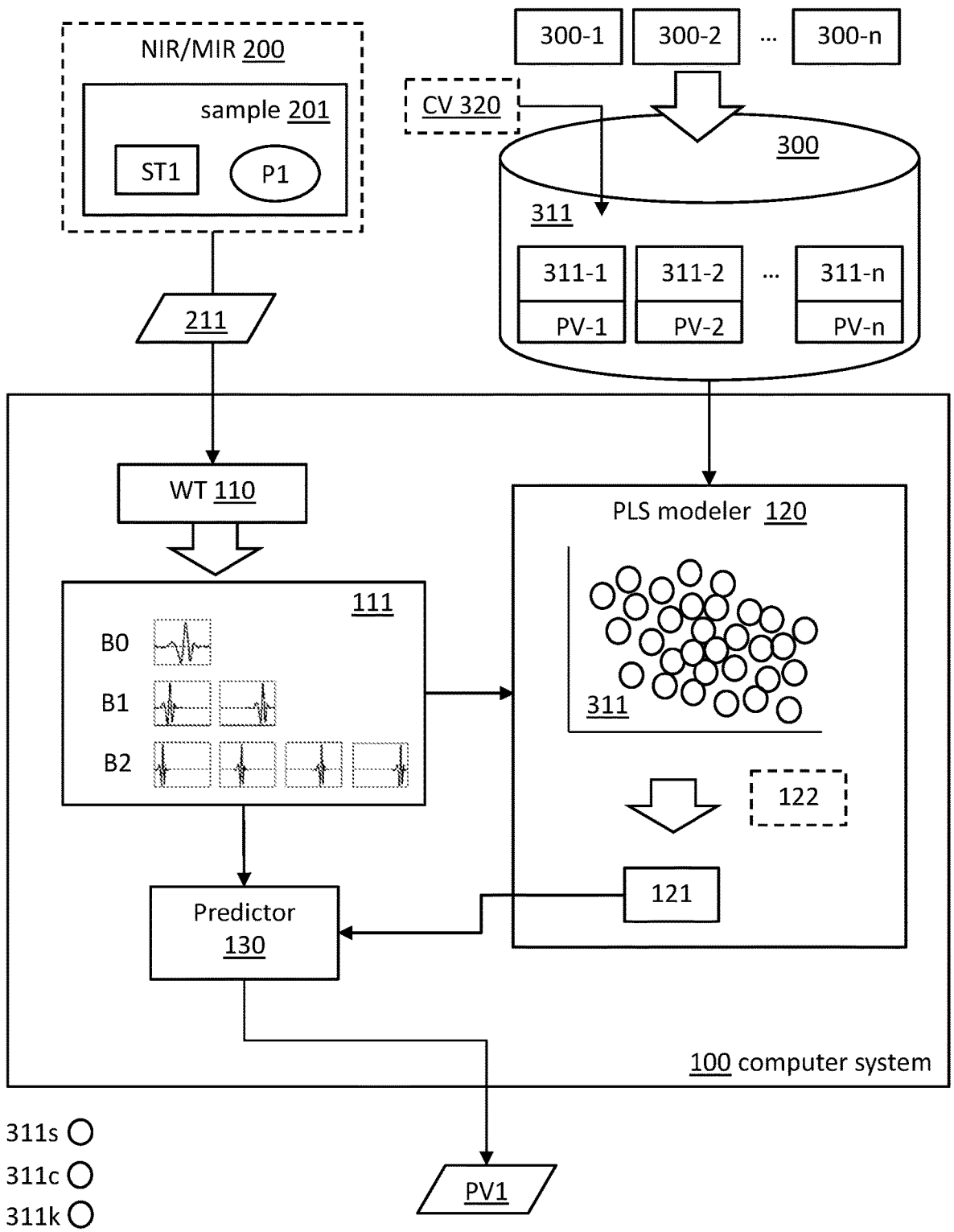
FIG. 1 includes a block diagram of an example embodiment of a computer system for predicting a property value of a sample based on a NIR/MIR spectrum obtained from said sample.

FIG. 1 illustrates a block diagram of an example embodiment of a computer system 100 for predicting a property value of a sample 201 based on a NIR/MIR spectrum 211 obtained from said sample 201 by using an appropriate NIR/MIR spectrometer 200. The sample 201 may have multiple properties. In the herein described example, the property of interest is property P1 for which the respective property value is to be predicted. Examples of properties which can be predicted based on NIR/MIR spectra include (but are not limited to) a concentration of: a particular compound in the measured sample, the iodine number, the pH value, the content of water, protein, fat, fiber, ash, fatty acids, and free fatty acids; or another property not related to a concentration comprising: density, viscosity, octane and cetane number. The sample 201 in the example has sample type ST1.

Figure 2:
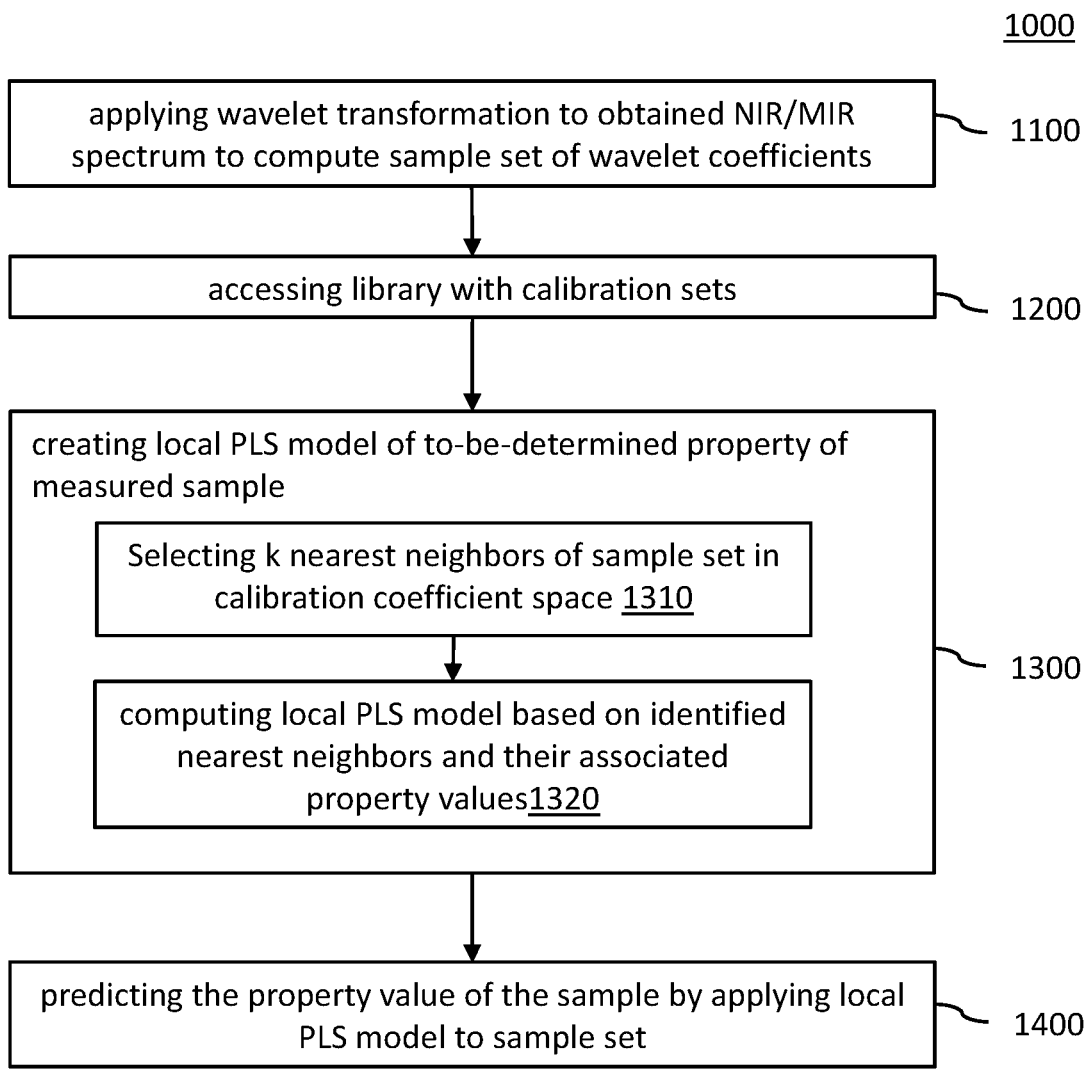
FIG. 2 is a simplified flow chart of a computer-implemented method for predicting a property value of a sample based on a NIR/MIR spectrum obtained from said sample.

FIG. 2 is a simplified flow chart of a computer-implemented method 1000 for predicting a property value of a sample based on a NIR/MIR spectrum obtained from said sample. The method 1000 can be executed by the system 100 of FIG. 1. The system 100 of FIG. 1 is now described in the context of the simplified flow chart of method 1000. Therefore, the following description refers to reference numbers used in FIG. 1 and FIG. 2. The system 100 is thereby configured to execute the method 1000 when loading a respective computer program into a memory of the system and executing said program with processing means of the system.

Figure 3:
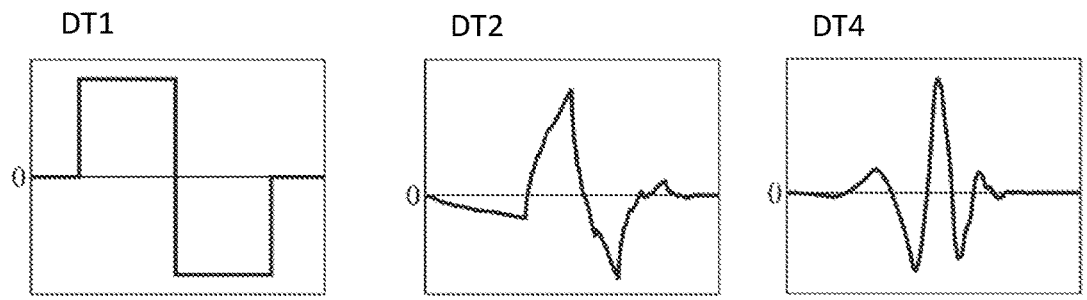
FIG. 3 illustrates examples of wavelet types of the common Daubechies wavelet family.

A wavelet transformation module applies a wavelet transformation 110 to the obtained spectrum 211 and thereby computes a sample set 111 of wavelet coefficients in a plurality of wavelet bands B0, B1, B2. The sample set 111 is illustrated with three wavelet bands. However, typically the number of wavelet bands is higher. Turning briefly to FIG. 3, three different example wavelet types DT1, DT2 and DT4 of the common Daubechies wavelet family are shown. DT1 illustrates the Daubechies type 1 (often referred to as Haar). DT2 and DT4 illustrate the Daubechies types 2 and 4, respectively. Such simple wavelet transformation types can be used for operating the wavelet transformation 110 because they serve the purpose to decompose the spectrum 211 for using the computed wavelet coefficients of the sample set directly. In particular when using a discrete wavelet transformation, the wavelet transformation and the coefficients of the sample set 111 are orthogonal. With other types of wavelet transformations, it is still possible to select coefficients which are orthogonal. This property of wavelet transforms is advantageous because it allows to select or combine wavelet transforms as required in a later modelling step for PLS or multivariate methods. Optionally, the wavelet coefficients of the sample set may be normalized by using vector normalization.

Figure 4:
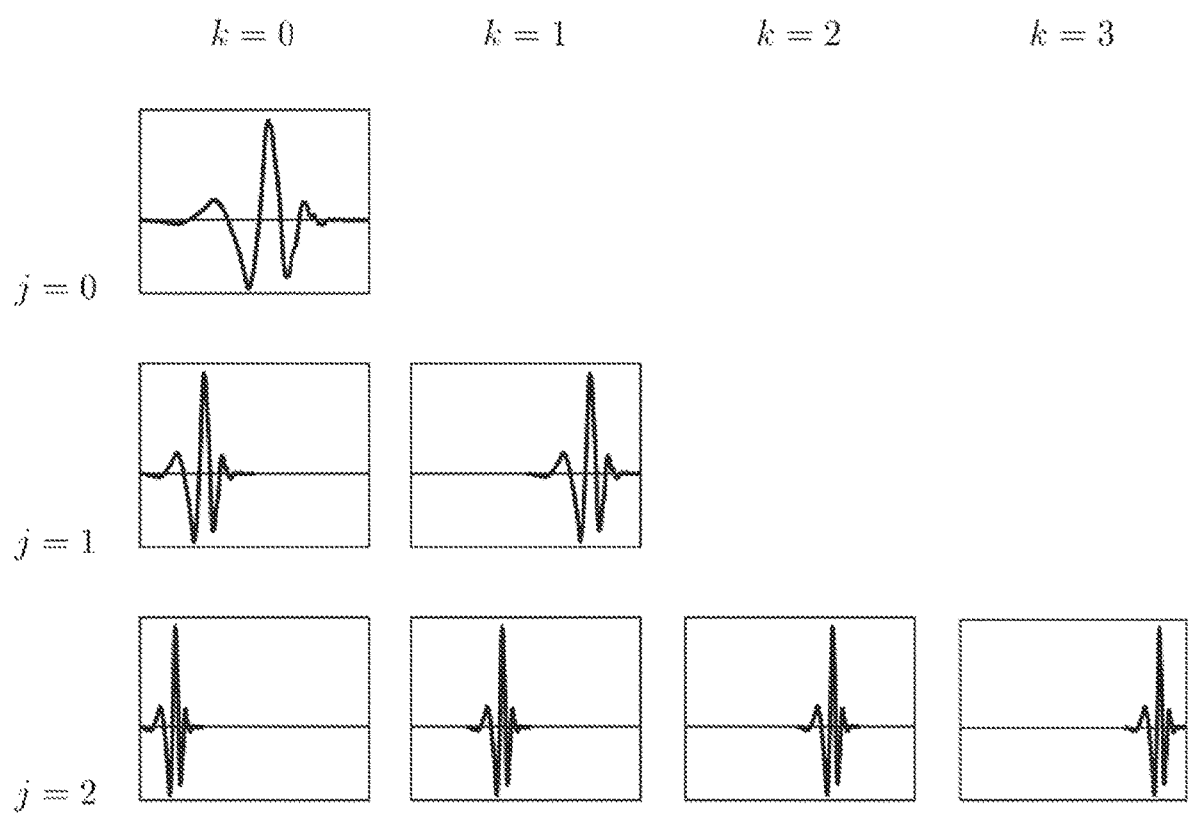
FIG. 4 illustrates dilatation change and translation of a Daubechies 4 wavelet over three low frequency wavelet bands.

Turning briefly to FIG. 4, dilation change and translation of a Daubechies 4 wavelet is illustrated over three low frequency wavelet bands j=0, j=1, and j=2. The wavelet of band j=0 can be adapted in width to cover different frequency components in the signal in higher bands. For example, the width of the wavelet is reduced in band j=1 and again in band j=2. A narrow-scaled wavelet can also analyze a higher frequency. By translation of the wavelet over the signal this frequency can be analyzed at different locations of the spectrum. Similarly, the even more narrowed wavelet in band j=2 can be used to analyze a spectrum at four different spectrum locations (k=0 to k=3).

Figure 5A:
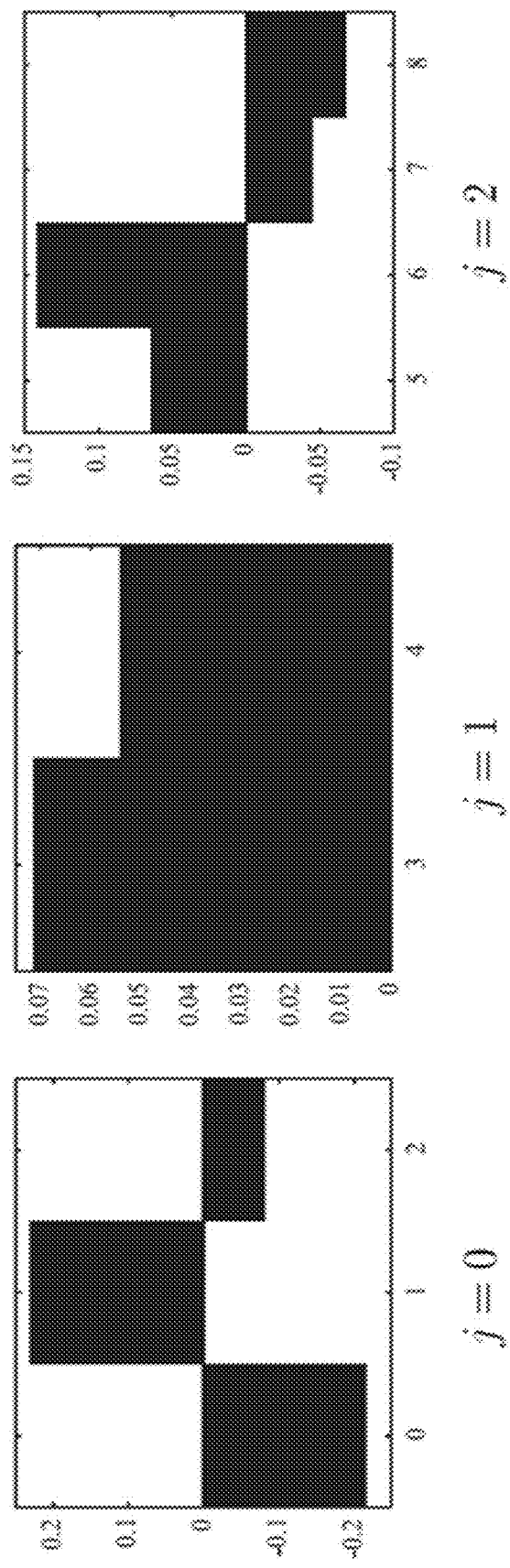
FIGS. 5A, 5B illustrate a wavelet transformation to several bands (levels) with wavelet coefficients for a spectrum combining two absorbance bands, a baseline and noise.
Figure 5B:
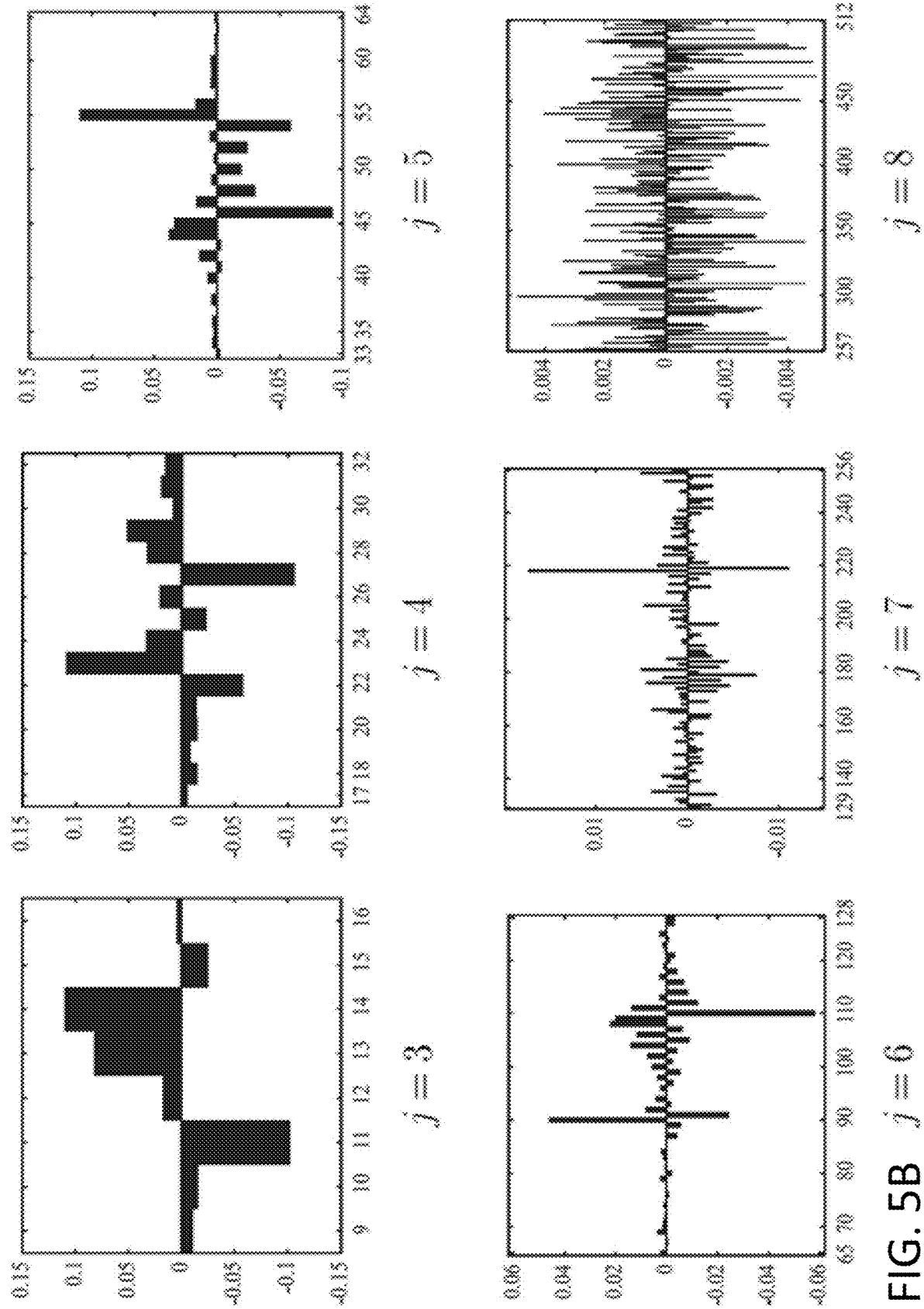

Turning briefly to FIGS. 5A, 5B, the wavelet transformation 110 is further explained by using an example with a spectrum f which includes two absorbance bands 501, 502, a baseline (the bended bow shaped curve 503 extending from 0 to 1024 datapoints) and some noise which is superimposed to the base line. For ease of explanation, example spectrum f has been obtained by simulation.

The wavelet coefficients of the wavelet transform are sorted in wavelet bands (or levels) starting from a low frequency band (j=1) with only one or two coefficients covering the whole spectral range of the signal (the simulated spectrum f). As mentioned earlier, the coefficients of band j=0 are the so-called approximation or scaling coefficients having no relevance for the herein disclosed method and system and are therefore ignored by the further processing steps. In the example, band j=1 has coefficients 3, 4, band j=2 has coefficients 5 to 8, band j=3 has coefficients 9 to 16, and so on. The number of coefficients is always doubled in the next higher band and the corresponding analyzed frequency is increased. The highest band(s) (j=8, j=7) in the example of FIG. 5B show mainly noise. However, in case of a smooth spectrum, also such highest bands may still include some valuable information. The valuable coefficients are those with values higher than the values representing merely noise. In the simulated spectrum f, one can easily see which coefficients are important or valuable as they contain information about the two absorbance bands. Wavelet bands below band j=3 represent mainly baseline information or less important low frequency information. On the other hand, the higher bands j=7 and j=8 primarily represent noise. That is, the valuable information about the two absorbance peaks in spectrum f is in the bands j=3 to j=6.

Figure 6A:
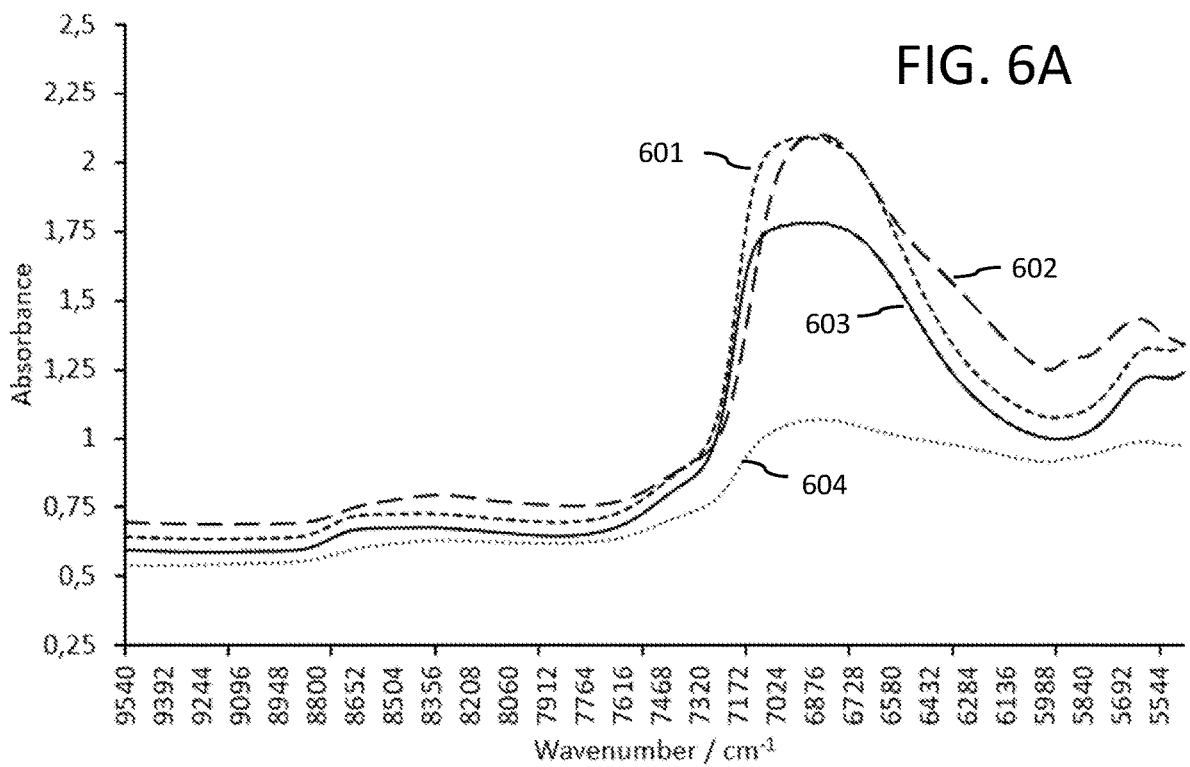
FIGS. 6A to 6J illustrate a wavelet transformation to several bands (levels) with wavelet coefficients for multiple NIR spectra obtained from different sugar product samples.
Figure 6B:
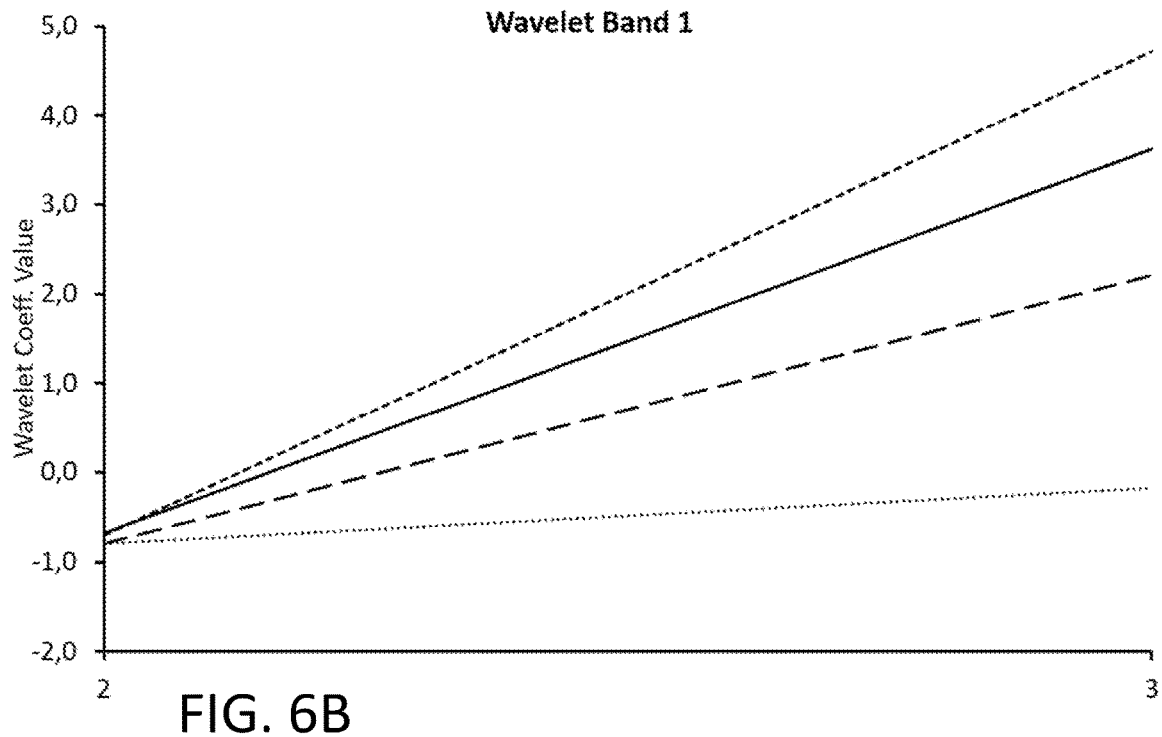
Figure 6C:
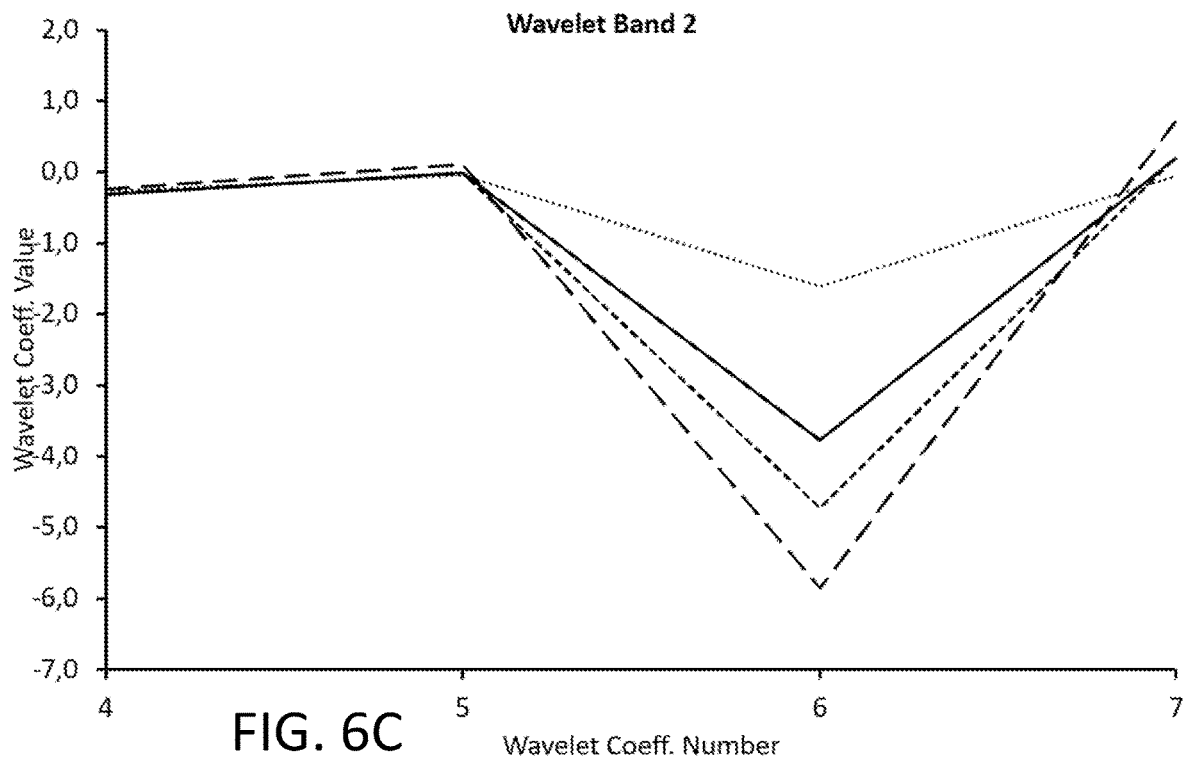
Figure 6D:
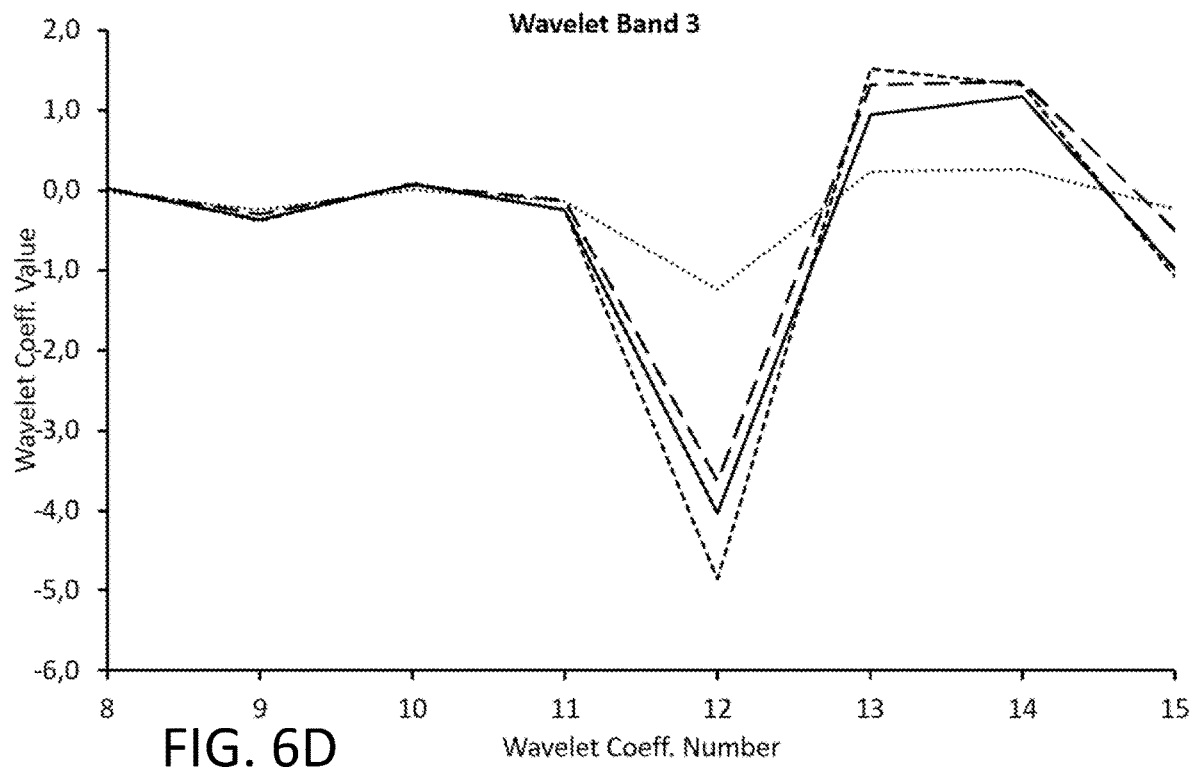
Figure 6E:
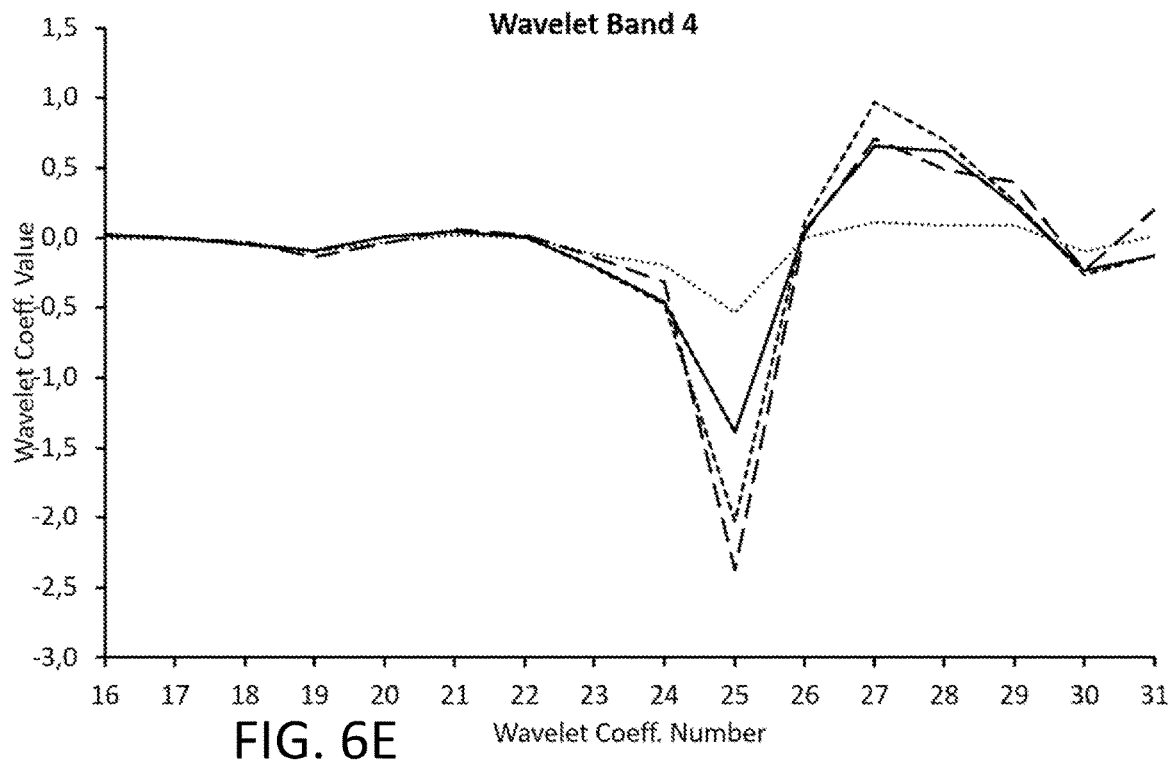
Figure 6F:
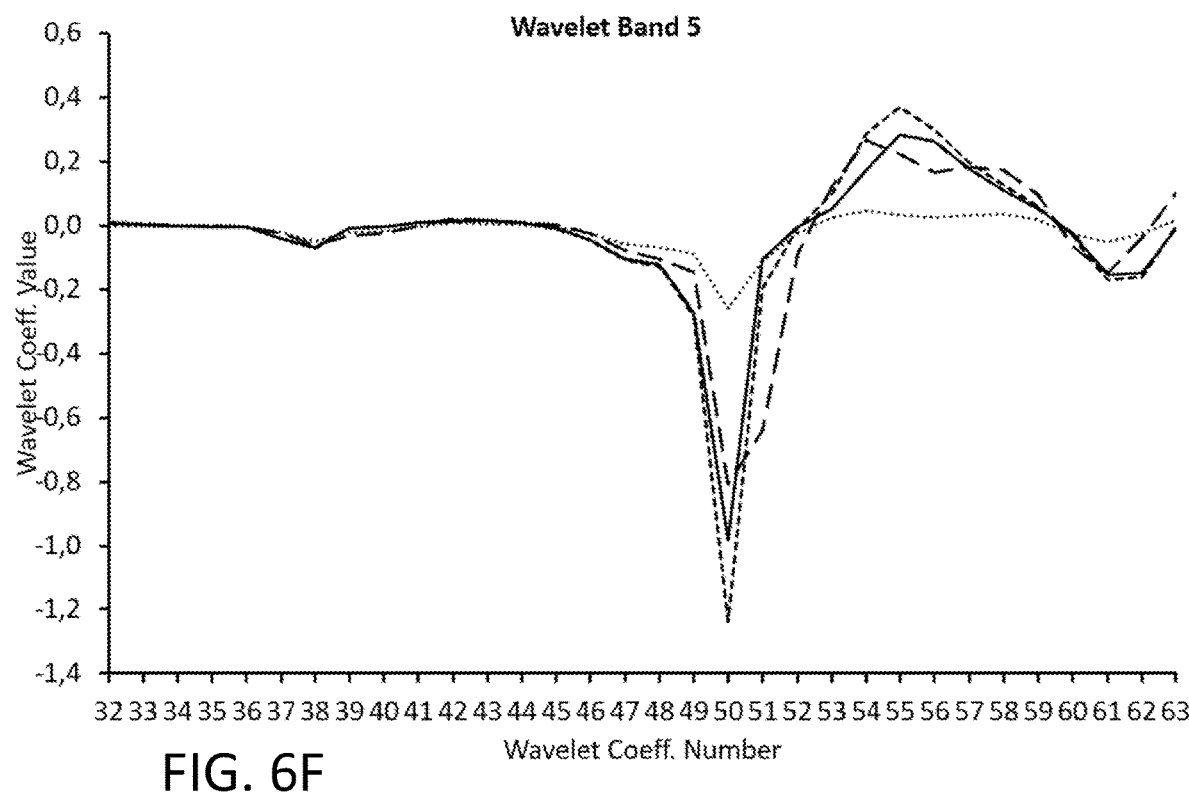
Figure 6G:
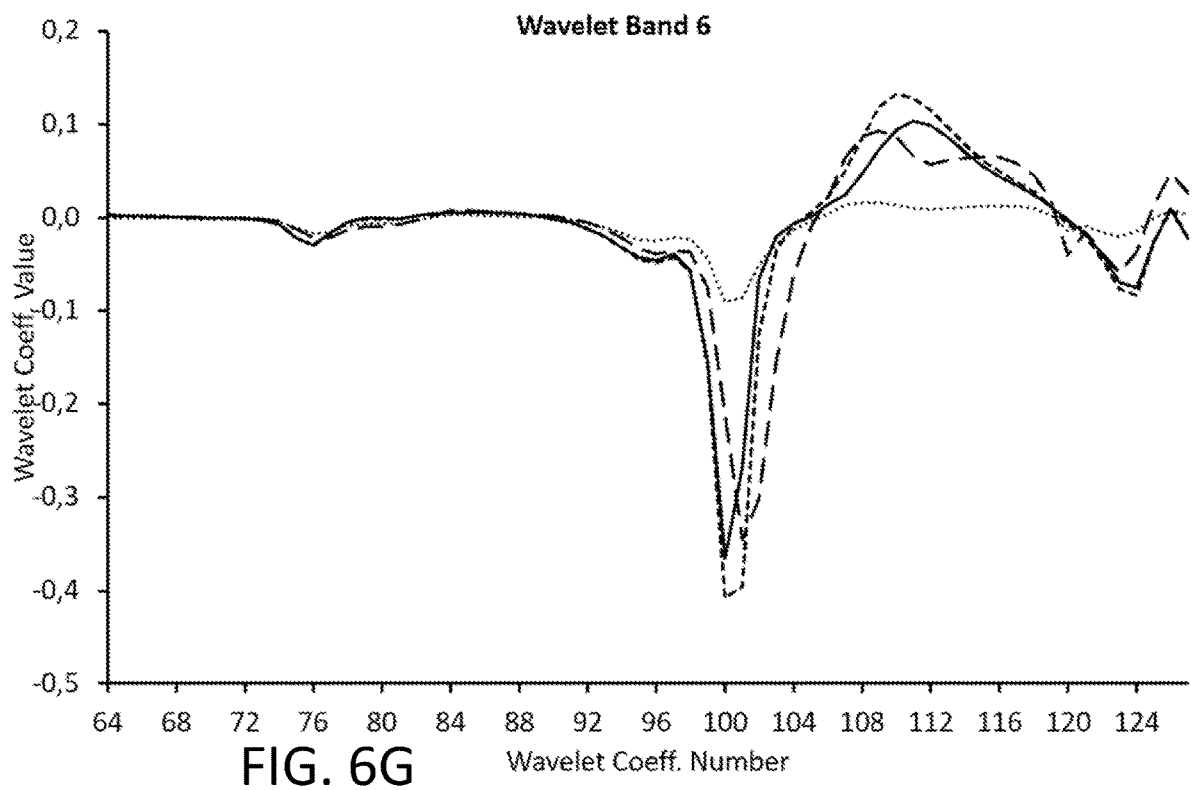
Figure 6H:
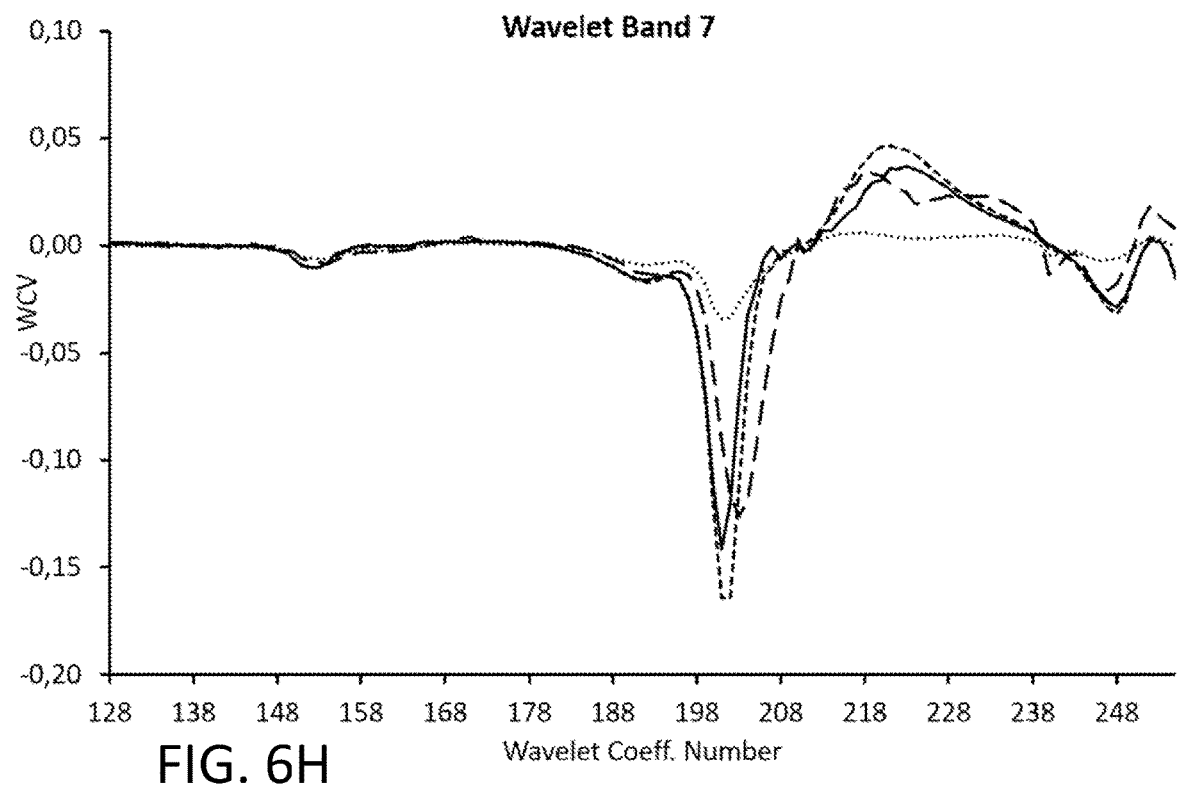
Figure 6I:
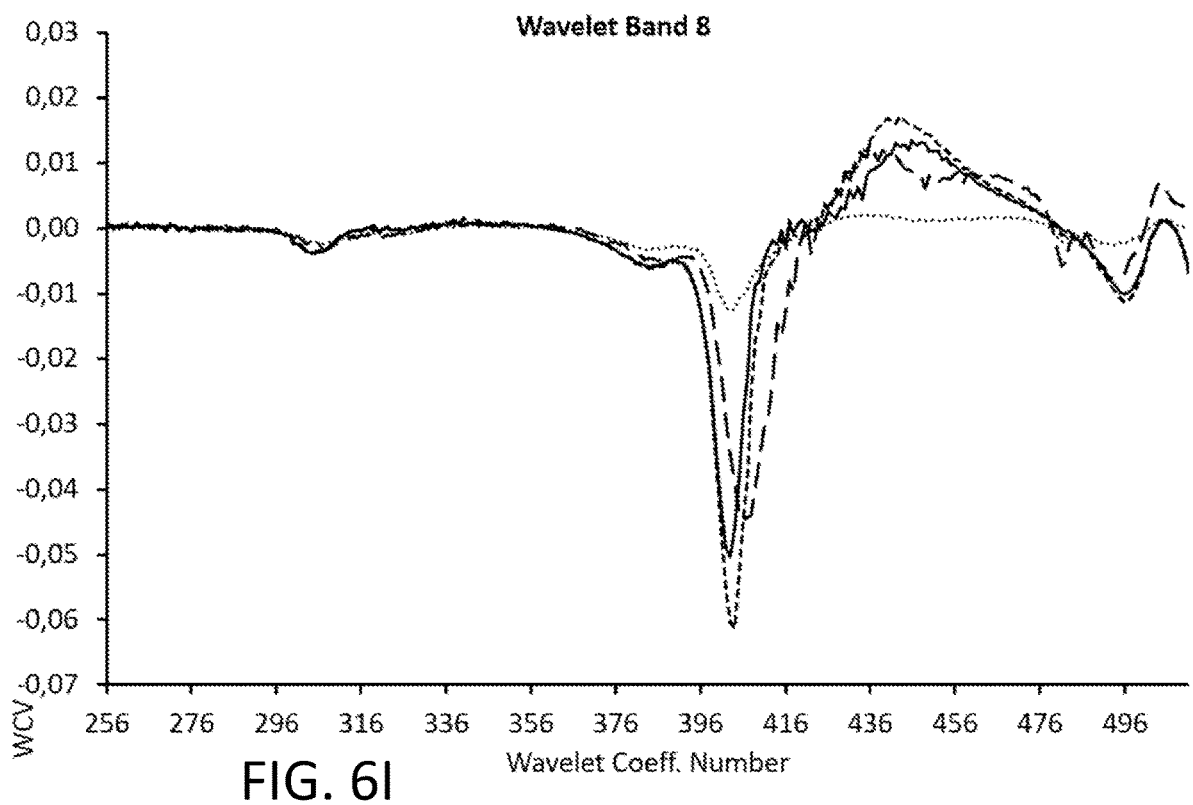
Figure 6J:
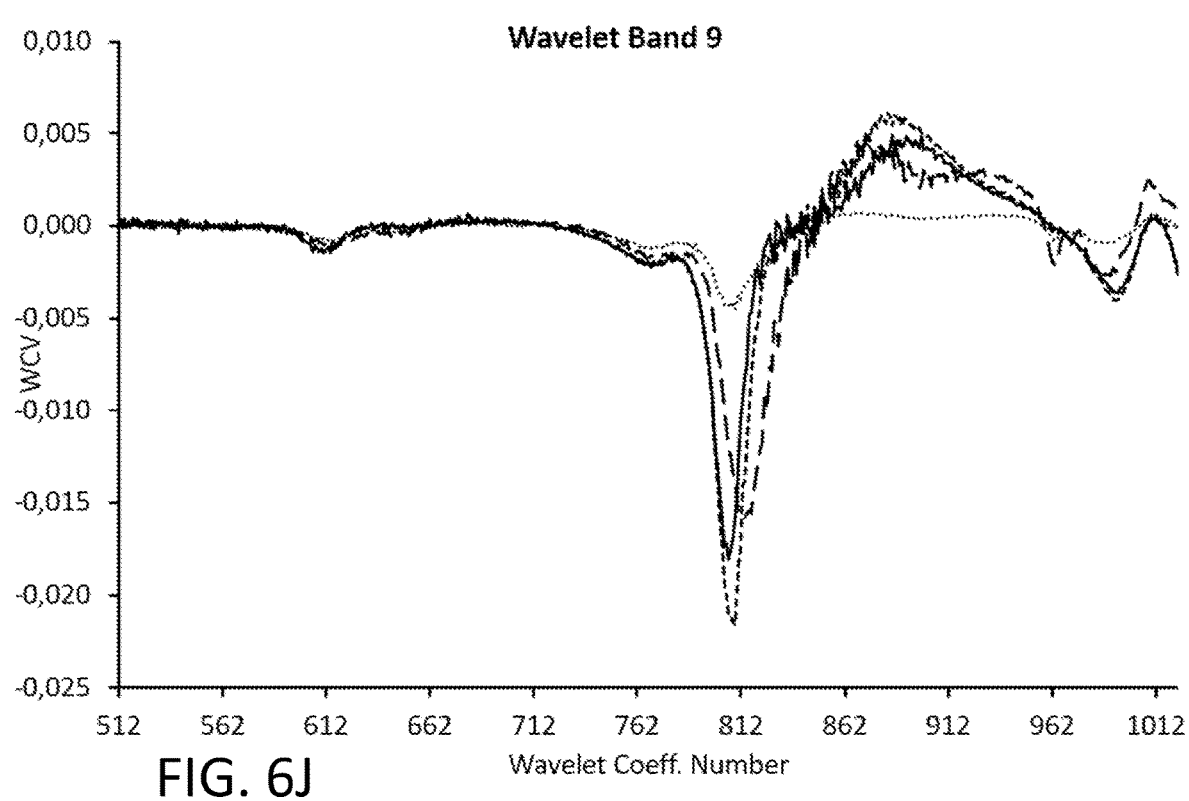

In the example illustrated by FIGS. 6B to 6J, nine wavelet bands (Band 1 to Band 9) are shown which have been obtained from real NIR spectra shown in FIG. 6A. FIG. 6A shows four NIR spectra 601 to 604 with each NIR spectrum represented by a different line style. The wavelet transforms in FIGS. 6B to 6J use the corresponding line styles for the respective wavelet transforms. Also for the wavelet transforms of the real NIR spectra 601 to 604 the result is similar in that it shows that valuable information is spread over the different bands but always located as expected. The shape of the wavelet coefficient pattern changes by the analyzed frequency and allows to select such wavelet coefficients which are advantageous for a given property to be calibrated. It is to be noted that the wavelet coefficients increase when the absorbance of the samples increases. That is, Beer's law remains valid.

Turning back to FIGS. 1 and 2, the system 100 accesses 1200 a library 300 with a plurality of calibration sets 311-1 to 311-n, 311c of wavelet coefficients defining a calibration coefficient space 311. The library can also be an integral component of system 100, or it may be stored on a remote storage which can be accessed by system 100 via an appropriate interface. For example, the library 300 may be stored on a public or private cloud server and system 100 may access the library via the Internet or via an Intranet, respectively. The calibration sets 311-1 to 311-n, 311c have been computed by wavelet transformations of respective NIR/MIR spectra 300-1 to 300-n which were obtained from calibration samples. The library includes at least calibration sets related the particular sample type ST1 of the measured sample 201. Each calibration set is associated at least with one reference property value PV-1 to PV-n of a particular property of the respective calibration sample. Nonetheless, for a calibration sample, multiple reference property values for multiple properties may have been measured and stored in the library together with the respective calibration set.

Figure 7:
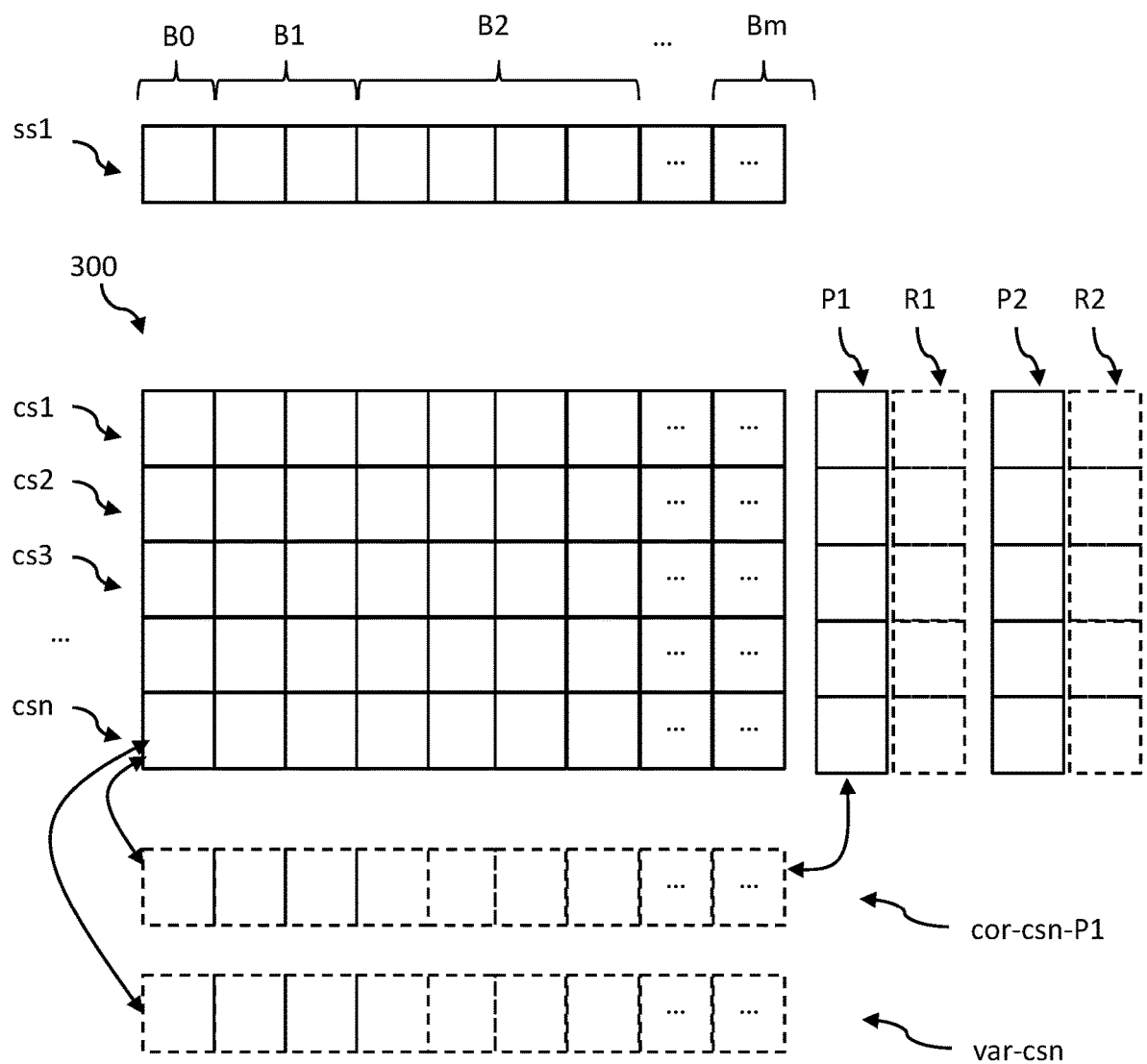
FIG. 7 is a schematic overview of the structure of a library with a plurality of calibration sets of wavelet coefficients defining a calibration coefficient space according to an embodiment.

Turning briefly to FIG. 7, a scheme of the library 300 is shown together with a sample set ss1 which is derived via wavelet transformation from an obtained NIR/MIR spectrum. The sample set ss1 includes the wavelet coefficients in bands B0 to Bm. The calibration sets cs1 to can in the library 300 have the same structure as the sample set ss1. Each calibration set includes the wavelet coefficients computed from the respective calibration spectrum in the bands B0 to Bm. In addition, for each calibration set one or more reference values are stored for one or more properties P1, P2 of the respective calibration sample. As mentioned earlier, the reference values were measured by using a suitable a reference (calibration) method.

Turning back to FIGS. 1 and 2, a PLS modeler module 120 of the computer system 100 now creates 1300 a local PLS model 121 of the to-be-determined property value of said sample 201 based on information retrieved from the library 300. In a first step, the PLS modeler 121 selects 1310 a predefined number k of nearest neighbors 311k (kNN) of the sample set in the calibration coefficient space 311. In FIG. 1, a simplified two-dimensional coefficient space 311 is shown. In reality, the coefficient space 311 is multi-dimensional with the number of dimensions corresponding to the number of wavelet coefficients in the bands B0 to Bm (cf. FIG. 7). In FIG. 1, the point in the coefficient space 311 which corresponds to the coefficients of the wavelet transformed sample spectrum is illustrated by the black bullet 311s. All other circles with a white filling 311c and a dotted filling 311k are points representing calibration sets in the coefficient space 311. The selected k nearest neighbors are thereby represented by the circles 311k with the dotted fillings. As mentioned earlier, very good results have been achieved with k being in the range from 100 to 300 with 200 showing the most advantageous results. The selection of the kNNs is based on a mathematical distance between the sample point 311s and any calibration set in the multi-dimensional space 311. For example, such mathematical distance may be calculated by the equation given by Minkowski:

$$d_{ij} = \left[\sum_{i=k}^{n} |x_{ik} - x_{jk}|^p\right]^{\frac{1}{p}} \quad \text{(Equation 1)}$$

with k in equation 1 being the index of the coordinates, and p determining the type of distance.

The variant of the Minkowski distance with p=2 corresponds to the well-known Euclidean distance which, for example, can be used as determining the distance between the calibration sets and the sample set.

The k calibration sets with the shortest distance to the point 311s are finally selected as kNNs in the multi-dimensional coefficient space 311 by the PLS modeler 120. In one embodiment, selecting 1310 the kNNs may use the wavelet coefficients of only a single wavelet band, whereas the following computation 1320 of the local PLS model 121 may use wavelet coefficients of a plurality of wavelet bands.

In a next step, the PLS modeler finally computes 1320 the local PLS model 121 based on the selected k nearest neighbors 311k and their associated reference property values. In general, the PLS modeler may use all wavelet coefficients of all bands of the calibration sets for this computation. It is advantageous to use a plurality of wavelet bands for local PLS modeling since more information is thus provided. It is to be noted, that a skilled person in general knows how to compute a local PLS model based on a plurality of vectors in a multi-dimensional space. In general, for large data sets with many calibration sets (typically in the hundreds or thousands) or when combining many calibration sets of different samples or sample types, the local PLS model approach shows lower method errors (e.g., a lower Root Mean Squared Error of Prediction RMSEP), and is therefore more accurate than global PLS model based approaches using the same calibration sets.

When computing the local PLS model, the PLS modeler may further apply optional filter functions 122 to the kNN calibration sets. Two optional filter embodiments are shortly described in the context of FIG. 7. In one embodiment, for each wavelet coefficient of a calibration set csn the respective correlation cor-csn-P1 with a property P1 of the respective calibration sample is calculated. This correlation is computed for all of the selected k nearest neighbors. Wavelet coefficients with a correlation below a predefined correlation threshold value are then not used by the PLS modeler for creating the local PLS model. In other words, only calibration wavelet coefficients which are at or above the predefined threshold are used for computing the local PLS model. The PLS modeler may use wavelet coefficients with a correlation higher than the correlation threshold value are considered. An appropriate correlation threshold value is 0.85 but other threshold values may be used, too. The filtering via correlation coefficients r2 of the wavelet coefficients, for example with concentration values or other property values of the respective NIR samples, may be used to eliminate non-correlating or low-correlating coefficients, and to reduce computation times and improve the results. Indirectly, this embodiment is also a filter for filtering out coefficients that do not have a certain variance in the data set to be useful.

In a further embodiment, for each wavelet coefficient of a calibration set csn the respective variance var-csn is determined for the selected k nearest neighbors. For example, wavelet coefficients with a variance below 5% of the largest variance amongst the wavelet coefficients may not be used (i.e., filtered out) when creating the local PLS model for the selected k nearest neighbors. Filtering out wavelet coefficients which show low or no variance over the kNN calibration set allows to eliminate such coefficients which represent a baseline or total absorbance region in the underlying spectrum, and further reduces computation time.

A further filtering embodiment may use Hard-Thresholding or Shrinkage for too small wavelet coefficients. For example, wavelet coefficients of the calibration sets which are smaller than the average of the wavelet coefficients in the highest band likely represent noise and can be filtered out without losing relevant information when creating the local PLS model. That is, such filtering allows to eliminate parts of the underlying signal which do not contribute relevant information, and further saves computation time.

In a still further filtering embodiment, the PLS modeler may entirely disregard at least the lowest wavelet band and the highest wavelet band of the respective calibration sets when creating the local PLS model. As mentioned earlier, the lowest and highest bands in general do not contribute valuable information. The system 100 may further provide a user interface to a user of the system for receiving user inputs indicating additional bands to be ignored when creating the local PLS model. For example, a user analyzing the bands 6 to 9 in FIGS. 6G to 6J may recognize that these bands show significant redundancies and therefore provide the user input that besides the highest band 9 also the bands 7 and 8 are to be ignored by the PLS modeler when creating the local PLS model.

When building the library 300, a cross-validation module 320 (CV) may be associated with the library such that it can carry out a so-called cross validation. In such a cross validation, each calibration set is analyzed with WLR and an appropriate rank is determined by comparing rank-dependent results for the respective calibration set with the respective known reference value. In this embodiment, the optimal rank can be saved with each calibration set in the library. FIG. 7 further illustrates an extension of the library 300 where, in addition to the reference values for properties P1, P2, a corresponding rank R1, R2 is stored for the respective calibration set. In other words, in this embodiment, each calibration set cs1 to csn in the library 300 has a rank R1 associated with a corresponding property that was determined by a cross-validation of a corresponding local regression model for the respective calibration set with regard to the corresponding property P1, P2. When expanding the library in this embodiment with new calibration sets based on respective calibration NIR/MIR spectra a new cross-validation becomes necessary but only for those new sets.

Figure 8:
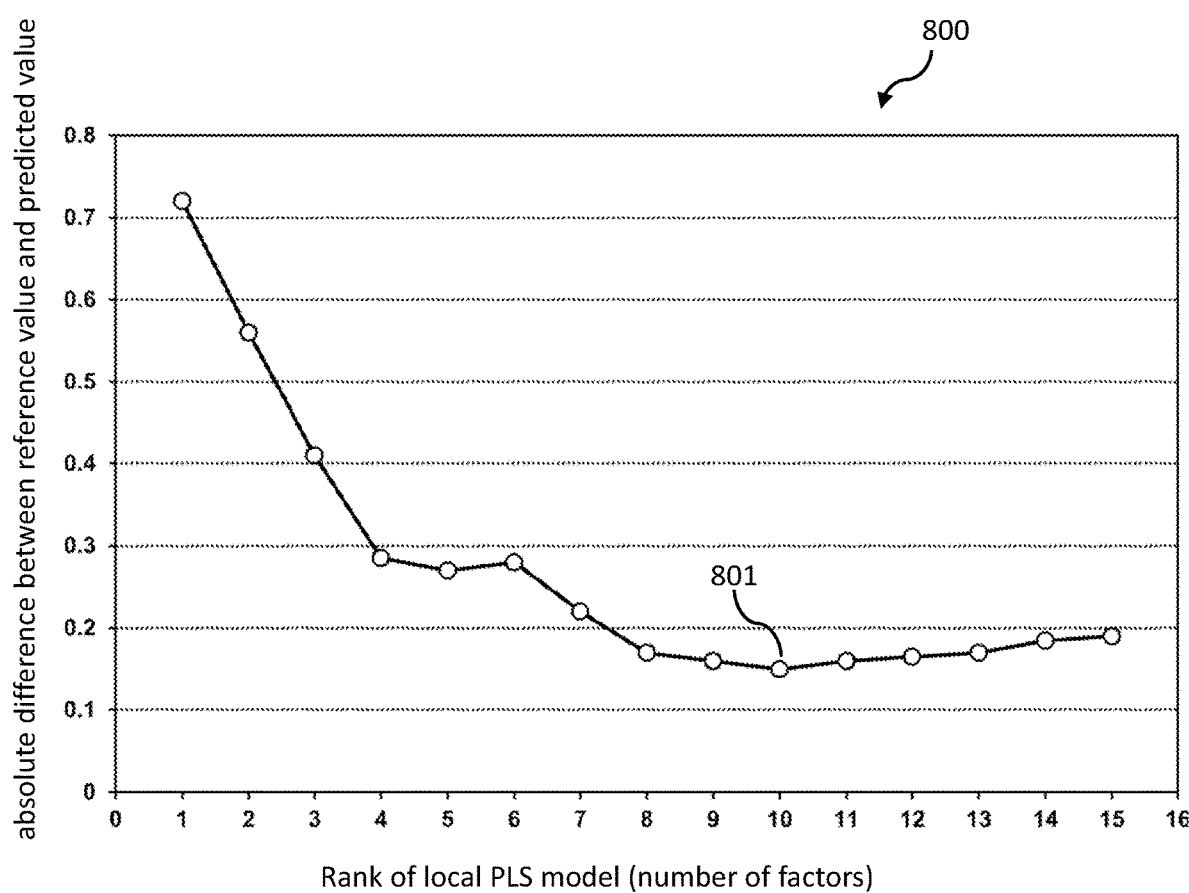
FIG. 8 illustrates a scheme for determining an optimal rank for a calibration set with regard to a particular property of the respective calibration sample.

FIG. 8 illustrates a scheme 800 for determining an optimal rank 801 for a calibration set with regard to a particular property of the respective calibration sample. The rank of a PLS model is defined as the number of factors which are used for the PLS model. The selection of the optimal number of factors (or loadings) in multivariate calibrations allows to avoid under- or over-fitting the local PLS model. If too few factors are used, an under-fitted model is obtained, which means that the model is not covering enough of important and analyte related variability in the data. If too many variables or factors are used, an over-fitted model may be obtained where noise and minor or irrelevant variations are included in the model. Both cases can result in poor predictions on measured NIR/MIR samples. The optimal number of factors (i.e., the optimal rank) can be determined by plotting the absolute difference between the reference value (of the respective calibration set) of the property to be modeled and the predicted value (value predicted by the local PLS model with the respective number of factors) versus the number of PLS factors as illustrated by the example of FIG. 8. The optimal rank is the number of factors where the plotted curve has its minimum. In the example, the optimum result is achieved by the local PLS model with rank 10.

When the PLS modeler creates the local PLS model, the rank of the created local PLS model used for determining the to-be-determined property value of the sample can be determined by either using the rank which is associated with the majority of the selected k nearest neighbors, or by computing the rank as the rounded average of the ranks of the selected k nearest neighbors.

The herein disclosed calibration library with calibration sets (wavelet transforms of the original calibration spectra) achieves a significant data reduction compared to the prior art spectrum base approaches. When using the various optional wavelet coefficient filtering mechanisms disclosed above, a data compression rate up to 90% was achieved. On the one hand, this allows to significantly speed up the computations for creating the local PLS models when analyzing new NIR/MIR spectra obtained from corresponding samples. On the other hand, it allows to distribute the library on respective NIR/MIR devices in a network. Such networked NIR/MIR devices become increasingly important and the data load is relevant not only with regard to the storage capacity but, more important, with regard to a global distribution of the library. This is particularly limited by the time required for the transmission of the device setup with calibration. The building of the library solely on the basis of wavelet transformed calibration sets is a model-free approach which allows easy extension of the library by simply adding new calibration sets to the library without any need to perform any further operation on the entire library (as it is the case for local regression approaches based on latent variables (scores) derived by principal component analysis or PLS). In this context it is advantageous that the herein disclosed approach also allows users of the system to expand the library with their own calibration data not requiring any centralized vendor-side update process for the library in case of using the global Rank setting.

Turning back to FIG. 1, a predictor module 130 of system 100 finally predicts 1400 the to-be-determined property value PV1 of the sample 201 by applying the local PLS model 121 to the sample set 111. A person skilled in the art understands "applying the local PLS model to the sample set" as performing a partial least squares regression as it is, for example, described in Wikipedia under the link https://en.wikipedia.org/wiki/Partial_least_squares_regression:

"Partial least squares regression (PLS regression) is a statistical method that bears some relation to principal components regression; instead of finding hyperplanes of maximum variance between the response and independent variables, it finds a linear regression model by projecting the predicted variables and the observable variables to a new space. Because both the X and Y data are projected to new spaces, the PLS family of methods are known as bilinear factor models. PLS is used to find the fundamental relations between two matrices (X and Y), i.e., a latent variable approach to modeling the covariance structures in these two spaces. A PLS model will try to find the multidimensional direction in the X space that explains the maximum multidimensional variance direction in the Y space. PLS regression is particularly suited when the matrix of predictors has more variables than observations, and when there is multi-collinearity among X values. By contrast, standard regression will fail in these cases (unless it is regularized)."

"A number of variants of PLS exist for estimating the factor and loading matrices T, U, P and Q. Most of them construct estimates of the linear regression between X and Y as $Y=X\tilde{B}+\tilde{B}_0$" (Equation 2)

In the embodiment where the library 300 also stores the optimal ranks for the calibration sets, the rank of the created local PLS model used for determining the property value of said sample is computed based on the ranks R1 of the k nearest neighbors. Thereby, either the rank which is associated with the majority of the selected k nearest neighbors is used for the rank of the local PLS model making the prediction, or the rank of the local PLS model is computed as the rounded average of the ranks of the selected k nearest neighbors.

Figure 9:
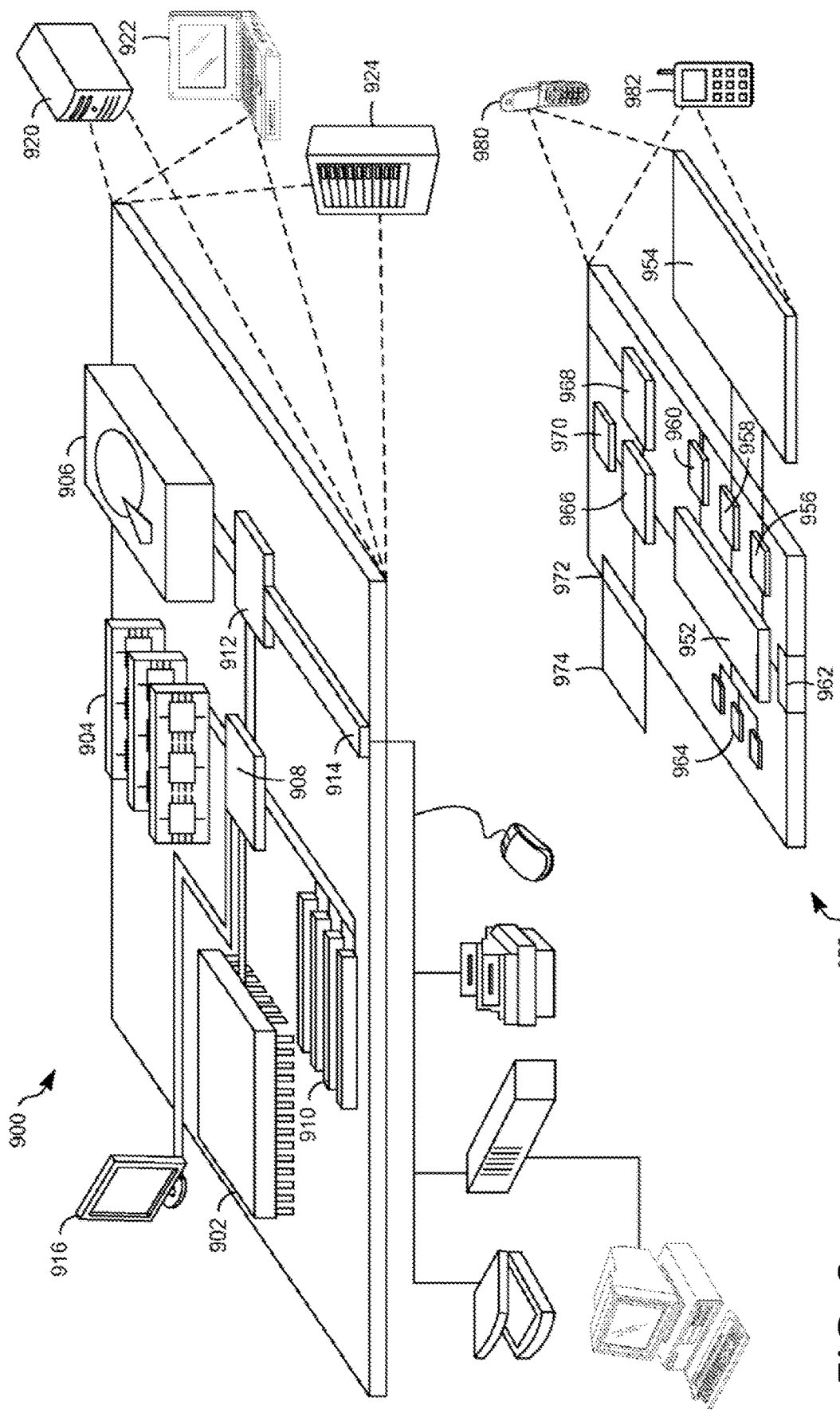
FIG. 9 is a diagram that shows an example of a generic computer device and a generic mobile computer device which may be used with the techniques described herein.

FIG. 9 is a diagram that shows an example of a generic computer device 900 and a generic mobile computer device 950, which may be used with the techniques described here. In some embodiments, computing device 900 may relate to system 100 (cf. FIG. 1). Computing device 950 is intended to represent various forms of mobile devices, such as personal digital assistants, cellular telephones, smart phones, and other similar computing devices. In the context of this disclosure the computing device 950 may provide I/O means for a user to interact with the computing device 950 (e.g., for receiving a selection of wavelet bands). The components shown here, their connections and relationships, and their functions, are meant to be exemplary only, and are not meant to limit implementations described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

The invention claimed is:

1. A computer-implemented method for predicting a property value of a sample of a particular sample type (ST1), based on a NIR/MIR spectrum obtained from the sample, comprising:
applying a wavelet transformation to the obtained spectrum to compute a sample set of wavelet coefficients in a plurality of wavelet bands;
accessing a library with a plurality of calibration sets of wavelet coefficients defining a calibration coefficient space, the calibration sets computed by wavelet transformations of respective NIR/MIR spectra previously obtained from calibration samples of at least the particular sample type, each calibration set being associated with one or more reference property values of the respective calibration sample;
creating a local PLS model of the to-be-determined property value of said sample by:
selecting a predefined number k of nearest neighbors of the sample set in the calibration coefficient space, wherein the predefined number k of nearest neighbors is less than a number of wavelet coefficients in the sample set, and computing the local PLS model based on the selected k nearest neighbors and their associated reference property values;
predicting the property value of said sample by applying the local PLS model to the sample set.

2. The method of claim 1, wherein the wavelet coefficients of the sample set are normalized by using vector normalization.

3. The method of claim 1, wherein the k nearest neighbors are selected based on a Minkowski distance between the respective calibration sets and the sample set.

4. The method of claim 1, wherein for each wavelet coefficient of a calibration set the respective variance is determined for the selected k nearest neighbors, and wherein wavelet coefficients with a variance below 5% of the largest variance amongst the wavelet coefficients are not used when creating the local PLS model for the selected k nearest neighbors.

5. The method of claim 1, wherein for each wavelet coefficient of a calibration set the correlation with a property of the respective calibration sample is calculated for the selected k nearest neighbors, and wherein wavelet coefficients with a correlation below a predefined correlation threshold value are not used for creating the local PLS model.

6. The method of claim 1, wherein each calibration set in the library has a rank that was determined by a cross-validation of a corresponding local regression model for the respective calibration set with regard to a corresponding property, and wherein the rank of the created local PLS model used for determining said property value of said sample is computed based on the ranks of the selected k nearest neighbors.

7. The method of claim 6, wherein the rank of the created local PLS model used for determining said property value of said sample is computed by any of the following:
using the rank which is associated with the majority of the selected k nearest neighbors;
or
computing the rank as the rounded average of the ranks of the selected k nearest neighbors.

8. The method of claim 1, wherein applying a wavelet transformation comprises computing a universal threshold value of the wavelet coefficients of the highest wavelet band of the sample set for the selected k nearest neighbors, and ignoring all wavelet coefficients with a value below said computed threshold value when creating the local PLS model.

9. The method of claim 1, wherein at least the lowest wavelet band and the highest wavelet band of the computed sample set are ignored when creating the local PLS model.

10. The method of claim 1, wherein the wavelet transformation transforms the obtained spectrum into wavelets of any of the following wavelet types: Haar wavelet; Daubechies wavelets db2, db4, db6, and db8; Morlets; Symlets; Coiflets; and Biorthogonal wavelets.

11. The method of claim 1, wherein the property value of said sample corresponds to any of the following:
a concentration of: a particular compound in the measured sample, the iodine number, the PH value, the content of water, protein, fat, fiber, ash, fatty acids, and free fatty acids; or
another property measurable by NIR/MIR spectroscopy comprising: density, viscosity, octane and cetane number.

12. The method of claim 1, wherein the wavelet transformation is a discrete wavelet transformation.

13. The method of claim 1, wherein selecting a predefined number of nearest neighbors uses the wavelet coefficients of a single wavelet band, and computing the local PLS model uses wavelet coefficients of a plurality of wavelet bands.

14. A computer program product for predicting a property value of a sample of a particular sample type, based on a NIR/MIR spectrum obtained from the sample, comprising computer-readable instructions that, when loaded into a non-transitory memory of a computing device and processed by one or more processors of the computing device, cause the computing device to:

apply a wavelet transformation to the obtained spectrum to compute a sample set of wavelet coefficients in a plurality of wavelet bands;

access a library with a plurality of calibration sets of wavelet coefficients defining a calibration coefficient space, the calibration sets computed by wavelet transformations of respective NIR/MIR spectra previously obtained from calibration samples of at least the particular sample type, each calibration set being associated with one or more reference property values of the respective calibration sample;

create a local PLS model of the to-be-determined property value of said sample by:

selecting a predefined number k of nearest neighbors of the sample set in the calibration coefficient space, wherein the predefined number k of nearest neighbors is less than a number of wavelet coefficients in the sample set, and computing the local PLS model based on the selected k nearest neighbors and their associated reference property values;

predict the property value of said sample by applying the local PLS model to the sample set.

15. The computer program product of claim 14, wherein the wavelet coefficients of the sample set are normalized by using vector normalization.

16. The computer program product of claim 14, wherein each calibration set in the library has a rank that was determined by a cross-validation of a corresponding local regression model for the respective calibration set with regard to a corresponding property, and wherein the rank of the created local PLS model used for determining said property value of said sample is computed based on the ranks of the selected k nearest neighbors.

17. The computer program product of claim 14, wherein the property value of said sample corresponds to any of the following:

a concentration of: a particular compound in the measured sample, the iodine number, the PH value, the content of water, protein, fat, fiber, ash, fatty acids, and free fatty acids; or another property measurable by NIR/MIR spectroscopy comprising: density, viscosity, octane and cetane number.

18. A computer system predicting a property value of a sample of a particular sample type, based on a NIR/MIR spectrum obtained from the sample, comprising functional modules adapted to apply a wavelet transformation to the obtained spectrum to compute a sample set of wavelet coefficients in a plurality of wavelet bands;

access a library with a plurality of calibration sets of wavelet coefficients defining a calibration coefficient space, the calibration sets computed by wavelet transformations of respective NIR/MIR spectra previously obtained from calibration samples of at least the particular sample type, each calibration set being associated with one or more reference property values of the respective calibration sample;

create a local PLS model of the to-be-determined property value of said sample by:

selecting a predefined number k of nearest neighbors of the sample set in the calibration coefficient space, wherein the predefined number k of nearest neighbors is less than a number of wavelet coefficients in the sample set, and computing the local PLS model based on the selected k nearest neighbors and their associated reference property values;

predict the property value of said sample by applying the local PLS model to the sample set.

19. The computer system of claim 18, wherein each calibration set in the library has a rank that was determined by a cross-validation of a corresponding local regression model for the respective calibration set with regard to a corresponding property, and wherein the rank of the created local PLS model used for determining said property value of said sample is computed based on the ranks of the selected k nearest neighbors.

20. The computer system of claim 18, wherein the property value of said sample corresponds to any of the following:

a concentration of: a particular compound in the measured sample, the iodine number, the PH value, the content of water, protein, fat, fiber, ash, fatty acids, and free fatty acids; or another property measurable by NIR/MIR spectroscopy comprising: density, viscosity, octane and cetane number.

* * * * *